United States Patent

[11] 3,604,508

[72] Inventor Marion O. Son, Jr.
 Littleton, Colo.
[21] Appl. No. 20,101
[22] Filed Mar. 16, 1970
[45] Patented Sept. 14, 1971
[73] Assignee Marathon Oil Company
 Findlay, Ohio
 Continuation-in-part of application Ser. No.
 781,593, Dec. 5, 1968, now abandoned.

[54] USE OF OIL-EXTERNAL MICELLAR
 DISPERSIONS AS PLUGGING AGENTS IN
 SUBTERRANEAN FORMATIONS
 23 Claims, No Drawings
[52] U.S. Cl. .................................................. 166/294,
 166/281, 166/256
[51] Int. Cl. .................................................. E21b 33/138
[50] Field of Search .......................................... 166/294,
 285, 275, 274, 283, 282, 281, 305 R, 256

[56] References Cited
UNITED STATES PATENTS

| | | | |
|---|---|---|---|
| 3,275,075 | 9/1966 | Gogarty et al. | 166/274 |
| 3,294,164 | 12/1966 | Hardy et al. | 166/274 |
| 3,315,744 | 4/1967 | Dunlap | 166/275 X |
| 3,330,343 | 7/1967 | Tosch et al. | 166/274 X |
| 3,343,599 | 9/1967 | Eddins, Jr. et al. | 166/294 |
| 3,348,611 | 10/1967 | Reisberg | 166/275 |
| 3,361,313 | 1/1968 | Riggs, Jr. et al. | 166/275 X |
| 3,373,809 | 3/1968 | Cooke, Jr. | 166/275 X |
| 3,398,792 | 8/1968 | Abdo | 166/275 |
| 3,493,051 | 2/1970 | Gogarty | 166/275 X |

Primary Examiner—Stephen J. Novosad
Attorneys—Joseph C. Herring, Richard C. Willson, Jr. and Jack L. Hummel ABSTRACT: Highly permeable subterranean formations are effectively blocked, e.g. against water intrusion, by injecting into the formation a micellar dispersion comprised of hydrocarbon, surfactant and aqueous medium having a viscosity of at least about 50 cp. at ambient temperature. Co-surfactants and electrolytes are also useful in the micellar dispersion to obtain desired viscosity characteristics.

USE OF OIL-EXTERNAL MICELLAR DISPERSIONS AS PLUGGING AGENTS IN SUBTERRANEAN FORMATIONS

CROSS-REFERENCE TO RELATED APPLICATIONS

This application is a continuation-in-part of copending application Ser. No. 781,593, filed Dec. 5, 1968, and now abandoned.

BACKGROUND OF THE INVENTION

1. Field of the Invention

This invention relates to methods for reducing the effective porosity (or permeability) of highly permeable subterranean formations by introduction of a stable viscous micellar dispersion into a well bore penetrating the formation. The invention further relates to methods for blocking portions of the formation from intrusion of fluids, particularly water.

The blocking of subsurface fluids in petroleum technology if desirable in many instances, e.g. in the drilling of a well where it is desired to block subterranean water from drilling operations; in sealing formations subject to in situ combustion; in selectively plugging permeable portions of formations subject to hydraulic fracturing, preventing the intrusion of fluids such as water into mines; etc.

2. Description of the Prior Art

U.S. Pat. No. 3,343,599 to Eddins, Jr. et al. teaches a method of reducing the porosity of subterranean formations by injecting a viscous thixotropic emulsion into the formation. The emulsion contains an external fluid immiscible with the connate fluid.

Applicant has discovered that a micellar dispersion having a viscosity of at least 50 cp. at ambient temperature (22°–23° C.) can be used as an effective blocking agent for subterranean formations. The design of the micellar dispersion can be for a permanent blockage, a selective blockage, or a reversible-type blockage (i.e. the blockage can be removed). Blockage with micellar dispersions as compared to emulsions is a more complete and effective blockage since the former are thermodynamically stable systems whereas the emulsions are not, i.e. an emulsion will eventually separate into two distinct phases, this even being characteristic of the so-called "stable" emulsions. Thus, blockage with emulsions is not as effective as blockage with a thermodynamically stable system since the former will eventually separate into two distinct phases which will have different viscosities and thus different blocking characteristics.

DESCRIPTION OF THE INVENTION

The term "micellar dispersion" as used herein is meant to include micellar solutions and microemulsions. Micellar dispersions differ from emulsions in many ways, e.g. the micellar dispersion is a thermodynamically stable system whereas the emulsion is not, the micellar dispersion is generally transparent whereas the emulsions are generally opaque and the equilibrium of the micellar dispersion tends toward further dispersion of the internal phase rather than coalescence of the phase, the latter characteristic of emulsions.

The micellar dispersion is composed of hydrocarbon, aqueous medium, and surfactant. Optionally, electrolyte and/or cosurfactant can be incorporated into the micellar dispersion. Examples of volume amounts include about 10 percent to about 70 percent hydrocarbon, about 1 percent to about 70 percent or more of aqueous medium, and about 4 percent to about 25 percent surfactant. Where desired, about 0.01 percent to about 20 percent or more of cosurfactant, and about 0.001 percent to about 5 percent (based on aqueous medium) of electrolyte can be incorporated into the micellar dispersion. In addition, the dispersion can contain other additives such as oxygen scavenging agents, corrosion inhibiting agents, bactericides, weighting agents, etc.

Examples of hydrocarbon include crude oil, partially refined fractions of crude oil, and refined fractions of crude oil. Specific examples include side cuts from crude columns, crude column overheads, gas oils, kerosene, heavy naphthas, naphthas, straight run gasoline, etc.

The surfactant can be cationic, anionic, or nonionic. Examples of useful surfactants are found in U.S. Pat. No. 3,254,714 to Gogarty et al. Preferably, the surfactant is a petroleum sulfonate, also known as an alkyl aryl naphthenic sulfonate. The surfactant should have the proper HLB characteristic, i.e. it should impart the proper hydrophil-lipophil balance to the micellar dispersions. Petroleum sulfonates having an average equivalent weight within the range of about 350 to about 525 are useful with this invention. For micellar dispersions having low water concentrations (i.e. less than about 50 percent water, by volume) the preferred surfactants have an average equivalent weight within the range preferably about 400 to about 490 and for high water concentration, the surfactants having an average equivalent weight within the range preferably from about 380 to about 420.

The aqueous medium can be soft, brackish, or brine water. Preferably, it is soft water but can contain small amounts of salts which are compatible with the ions within the subterranean formation. If the subterranean formation is characteristic of having a high brine content, the aqueous medium within the micellar dispersion can contain a high brine content. Where the blockage is to be of a permanent type, it is desirable that the salts or electrolyte in the aqueous phase of the micellar dispersion be at equilibrium with those salts in the connate formation fluids.

The cosurfactant (also identified as cosolubilizers and semipolar organic compounds) can be an alcohol, amino compound, ester, aldehyde, ketone, or other like material containing from about one to about 20 or more carbon atoms. Specific examples include isopropanol, n- and iso-butanol, amyl alcohols, primary and secondary aliphatic alcohols, alkaryl alcohols such as p-nonylphenol alcoholic liquors including fusel oil, hydroxy compounds such as 2-butoxyethanol, etc. Concentrations of from about 0.01 to about 5 percent by volume are especially useful in the micellar dispersion. In addition, the cosurfactant can be a mixture of two or more similar or different cosurfactants.

The electrolytes useful in the micellar dispersion include inorganic bases, inorganic acids, inorganic salts, organic acids, organic bases, and organic salts. Preferably, the electrolyte is compatible with the ions in the subterranean formation and is preferably an inorganic salt. Specific examples include sodium hydroxide, sodium chloride, sodium sulfate, hydrochloric acid, sulfuric acid, sodium nitrate, ammonium chloride, ammonium hydroxide, potassium chloride, and like materials. Additional examples can be found in U.S. Pat. No. 3,330,343 to Tosch et al. The type and concentration of electrolyte will depend on the aqueous medium, surfactant, cosurfactant, and hydrocarbon and in addition, the conditions of the reservoir, including temperature. The salts within the aqueous medium are also useful as electrolytes within this invention.

As mentioned, the micellar dispersion viscosity is at least about 50 cp. at ambient temperature (22°–23° C.). More preferably, the viscosity of the micellar dispersion is at least about 500 cp. and most preferably is greater than 1,000 cp. at ambient temperature for the more permeable formations. Where water encroachment or intrusion is the main culprit, the micellar dispersion can be specifically designed to take up water (e.g. emulsify) or reject or equilibrate with the connate water. The components within the micellar dispersion can be designed to obtain a desired viscosity, including relatively large viscosities. For example, water can be mixed with hydrocarbon and surfactant to obtain a highly viscous micellar dispersion. Electrolyte and cosurfactant are useful to alter, e.g. lower, the viscosity.

of the micellar dispersion is injected into the subterranean formation and the formation effectively blocked, the blockage can be removed by dissipating or reducing the viscosity of the micellar dispersion to a liquid that is readily fluid. Preferably, the dissipating liquid is miscible or acts like it is miscible with the external phase of the micellar dispersion. Examples of dissipating liquids useful for this invention include strong acids, strong bases, and substantially hydrocarbon or aqueous solutions which have at least some miscibility with the micellar dispersion.

Herein, by "blocking" or "blocked" is meant the condition of a subterranean formation resulting from a reduction in its effective porosity, and a concomitant reduction in its permeability to the intrusion of fluids to the extent that a substantial portion, if not all, of the intruding fluids are unable to penetrate the formation at the point where the obstruction or block is positioned. The passage or progress of the intruding fluids is rendered unsuitable by the obstruction created by the blockage. Herein, by "effective porosity" of the formation is meant the ratio of the volume of the interstices of the particular portion of formation under consideration, to the volume of the particular portion of the formation where the volume of the interstices will be equal to the volume of the interstices of the formation rock, normally diminished by the volume occupied by any solid or semisolid obstruction present, e.g. blocking material. Stated in another manner, the effective porosity of the formation is that porosity "seen" by the intruding fluid as it comes into contact with the formation i.e. the "density" of void spaces.

The following examples are presented to illustrate specific working embodiments of micellar dispersions having highly viscous characteristics. Unless otherwise specified, the percents are based on volume. The viscosities of the micellar dispersions are measured at 72° F. on a Brookfield viscometer.

EXAMPLE 1

The micellar dispersion is obtained by mixing 10 parts of a sodium petroleum sulfonate having an average equivalent weight of about 360, 96 parts of straight run gasoline and 25 parts of distilled water. The resulting viscosity of this micellar dispersion is equal to greater than 2,000 cp. at 72° F.

EXAMPLE 2

A micellar dispersion is formed in situ of the formation by injecting a stock solution containing 80 percent straight run gasoline, 10 percent of a sodium petroleum sulfonate having an average equivalent weight of 422 (identified as Petronate L, a trademark owned by Sonneborn Chemical Company) and 10 percent of a sodium petroleum sulfonate having an average equivalent weight of about 350 (identified as Pyronate 50, a trademark owned by Sonneborn Chemical Company). The stock solution comes in contact with connate water to produce a micellar dispersion having a viscosity in excess of about 1,000 cp.

EXAMPLE 3

Additional examples illustrating micellar dispersions useful with this invention are illustrated in table I. These compositions are obtained by mixing the surfactant and hydrocarbon and then adding water to obtain the indicated viscosities.

TABLE I

| Sample No. | Composition of Micellar Dispersion | Viscosity (cp.) at 72° F. |
|---|---|---|
| A | 7.5 g. of Shell sulfonate<br>2.5 g. of Pyronate 50<br>96 ml. hydrocarbon<br>(SRG+VO)<br>25 ml. distilled water | 88.5 |
| B | 7.5 g. Petronate K<br>2.5 g. Pyronate 50<br>96 ml. hydrocarbon<br>(SRG+VO)<br>25 ml. distilled water | 170 |
| C | 7 g. Shell sulfonate<br>3 g. Pyronate 50<br>96 ml. hydrocarbon<br>(SRG+VO)<br>25 ml. distilled water | 198 |
| D | 7 g. Petronate K<br>3 g. Pyronate 50<br>96 ml. hydrocarbon<br>(SRG+VO)<br>25 ml. distilled water | 400 |
| E | 5.5 g. Shell sulfonate<br>4.5 g. Pyronate 50<br>96 ml. hydrocarbon<br>(SGR+VO)<br>25 ml. distilled water | Greater than 2,000 |
| F | 10 g. Pyronate 50<br>96 ml. hydrocarbon<br>(SRG+VO)<br>25 ml. distilled water | "gel" |

Note:
1. Shell sulfonate, sodium petroleum sulfonate, Marketed by Shell Chemical Co., 100% active, since VO has been extracted, average equivalent weight 460–465.
2. Pyronate 50, sodium petroleum sulfonate, marketed by Sonneborn Chemical Co., New York, N.Y. 50% active sulfonate, average equivalent weight 360,
3. SRG is straight run gasoline;
4. VO is vehicle oil obtained from the Shell sulfonate.
5. Petronate K, sodium petroleum sulfonated, marketed by Sonneborn Chemical Co., New York, N.Y. 62% active sulfonate, average equivalent weight 420–450.

The above examples are not meant to limit the invention. Rather, all equivalents obvious to those skilled in the art are intended to be equated within the invention as defined in the specification and appended claims.

What is claimed is:

1. A method of reducing the effective porosity of a highly permeable subterranean formation comprising injecting into the formation a micellar dispersion comprised of hydrocarbon, surfactant, and aqueous medium, the dispersion having a viscosity of at least about 50 cp. at ambient temperature and sufficient to effectively reduce the porosity of the highly permeable subterranean formation.

2. The method of claim 1 wherein the surfactant is petroleum sulfonate.

3. The method of claim 2 wherein the petroleum sulfonate has an average equivalent weight within the range of about 350 to about 525.

4. The method of claim 1 wherein the micellar dispersion contains cosurfactant.

5. The method of claim 1 wherein the micellar dispersion contains electrolyte.

6. The method of claim 1 wherein the viscosity of the micellar dispersion is at least about 500 cp. at ambient temperature.

7. The method of claim 1 wherein the viscosity of the micellar dispersion is at least about 1,000 cp. at ambient temperature.

8. A method of blocking a highly permeable subterranean formation from intrusion of fluids, the method comprising injecting into the formation an oil-external micellar dispersion comprised of hydrocarbon, surfactant, and aqueous medium having a viscosity of at least about 50 cp. at ambient temperature and sufficient to effectively block the highly permeable subterranean formation.

9. The method of claim 8 wherein the surfactant is petroleum sulfonate.

10. The method of claim 9 wherein the petroleum sulfonate has an average molecular weight within the range of from about 350 to about 525.

11. The method of claim 8 wherein the micellar dispersion contains cosurfactant.

12. The method of claim 8 wherein the micellar dispersion contains electrolyte.

13. The method of claim 8 wherein the viscosity of the micellar dispersion is at least about 500 cp. at ambient temperature.

14. The method of claim 8 wherein the viscosity of the micellar dispersion is at least about 1,000 cp. at ambient temperature.

15. The method of claim 8 wherein the blockage is permanent.

16. The method of claim 8 wherein the blockage is selective.

17. The method of claim 8 wherein the blockage is reversible so that the blockage may be removed by introducing a dissipating liquid into the formation.

18. A method of blocking a highly permeable subterranean formation from water intrusion, the method comprising injecting into the formation a combination of hydrocarbon and surfactant capable of forming a micellar dispersion having a viscosity of at least about 50 cp. at ambient temperature upon contact with the connate water within the subterranean formation.

19. The method of claim 18 wherein the surfactant is petroleum sulfonate.

20. The method of claim 19 wherein the petroleum sulfonate has an average molecular weight within the range of from about 350 to about 525.

21. The method of claim 18 wherein the combination of hydrocarbon and surfactant contains cosurfactant.

22. The method of claim 18 wherein the viscosity of the micellar dispersion is at least about 500 cp. at ambient temperature.

23. The method of claim 18 wherein the viscosity of the micellar dispersion is at least about 1,000 cp. at ambient temperature.

UNITED STATES PATENT OFFICE
CERTIFICATE OF CORRECTION

Patent No. 3,604,508      Dated Sept. 14, 1971

Inventor(s) Marion O. Son, Jr.

It is certified that error appears in the above-identified patent and that said Letters Patent are hereby corrected as shown below:

Col. 2, line 66:      Delete "of" and insert --After--.

Table I, Col. 4, line 2:      Move "SRG+VO" from left column to under section titled "Composition of"

Table I, Col. 4, line 7:      Delete "SGR" and insert --SRG--.

Signed and sealed this 30th day of May 1972.

(SEAL)
Attest:

EDWARD M. FLETCHER, JR.
Attesting Officer

ROBERT GOTTSCHALK
Commissioner of Patents